United States Patent Office 3,317,281
Patented May 2, 1967

3,317,281
RECOVERY OF SULFUR FROM GASES CONTAINING HEAVY HYDROCARBONS
Howard Grekel, Tulsa, Okla., assignor to Pan American Petroleum Corporation, Tulsa, Okla., a corporation of Delaware
No Drawing. Filed July 12, 1965, Ser. No. 471,445
6 Claims. (Cl. 23—225)

This invention relates to the recovery of free sulfur from gaseous mixtures of hydrogen sulfide, such as, for example, sour natural gas. More particularly, it is concerned with the catalytic production of free sulfur from dilute mixtures of hydrogen sulfide in the presence of $C_2$ and heavier hydrocarbons without seriously decreasing the catalyst activity.

The sulfur currently produced in this country from sour natural gas and sour gaseous refinery streams amounts to approximately one million tons per year or about one-seventh of our total national production. From all indications, this proportion is increasing. Usually, the first step in the manufacture of sulfur from such sources is to subject the gas to a sweetening step which serves to separate the hydrogen sulfide from the hydrocarbons and other nonacidic components. In many instances, however, particularly in the case of certain natural gas streams, the composition thereof is such that separation of the hydrogen sulfide from the gaseous hydrocarbons via the conventional sweetening process is not economic because of the high percentage of inerts present. Such gas streams from which the hydrogen sulfide has been removed have a low B.t.u. content, are unfit as sales gas, and, if used at all can only be employed as a supplement for plant fuel. The sour natural gas streams contain relatively high percentages of inerts and heavy hydrocarbons can be used as feed stock for a plant in which free sulfur is recovered by the direct oxidation of hydrogen sulfide.

In the direct oxidation process, the presence of these inerts and hydrocarbons can be tolerated in relatively large amounts so long as the hydrogen sulfide content is at least about one percent. Usually in carrying out the direct oxidation on a commercial basis, at least two reactors are needed in order to secure a reasonable recovery of free sulfur. When no hydrocarbons or only a small amount of methane is present, good recoveries of sulfur from both reactors are obtained. However, if heavy hydrocarbons, i.e., those containing from about two to about ten carbon atoms, are present, the efficiency of a reactor is seriously impaired.

For example, with a gas containing 10 mol percent hydrogen sulfide and the balance $C_1$ to $C_{10}$ hydrocarbons plus inerts, sulfur of 99.9 percent purity can be produced by introducing enough oxygen (or air) in the first reactor, containing bauxite catalyst, to react with about half of the hydrogen sulfide to form sulfur and to produce a 300° F. temperature rise with a feed preheated to 500° F. Under such conditions, with 96 percent of the oxygen reacting, about half of the sulfur is recovered from this reactor. There is no apparent change in the activity of the bauxite catalyst over a period of weeks and the catalyst does not turn black. In the second reactor, which is also operated as a direct oxidation unit, if sufficient oxygen is added to react with the remainder of the hydrogen sulfide to produce sulfur and result in about the same temperature rise, i.e., from 500° F. of 800° F., the selectivity to sulfur is poor. The peak conversion over-all of hydrogen sulfide to free sulfur is about 85 percent, with only 70 percent of the hydrogen sulfide in the feed to the second reactor being converted to free sulfur. The relatively high second reactor temperature does not permit a favorable equilibrium for the formation of free sulfur. In an effort to improve the sulfur yield from the second reactor, attempts were made to operate it to recover sulfur by the Claus reaction of hydrogen sulfide with sulfur dioxide to produce sulfur. In other words, instead of adding oxygen, sulfur dioxide was introduced in an amount such as to give a hydrogen sulfide-sulfur dioxide molar ratio of about 2:1, the mixture heated to 450° F. and then introduced into the second reactor. Initially, the yield was high—near that estimated for equilibrium. The catalyst activity, however, decreased rapidly and after a few days when removed, was found to be black, indicating its activity to be poor. An active catalyst is normally gray after use over a short period of time.

Accordingly, it is an object of my invention to provide a method for obtaining free sulfur in maximum yield from gas streams of the type mentioned above without causing perceptible deactivation of the catalyst. It is a further object of my invention to convert the hydrogen sulfide in a stream of the aforesaid type to free sulfur by subjecting said stream to the Claus reaction, (i.e., reaction of hydrogen sulfide and sulfur dioxide to produce sulfur) or by first subjecting said stream to direct oxidation and thereafter taking the effluent from the direct oxidation step and subjecting the resulting effluent to Claus reaction conditions. It is another object of my invention to prevent deactivation of the catalyst employed in the aforesaid Claus reaction by conducting said reaction in the presence of a small concentration of oxygen. It is a further object of my invention to recover free sulfur from such streams by subjecting the latter to the Claus reaction in the presence of sufficient oxygen to minimize deactivation of the catalyst by deposition of products from cracking of the hydrocarbons present and/or deposition of carbon on the catalyst.

In carrying out one embodiment of the process of my invention, the feed to the Claus reactor is first preheated to a temperature of about 425° F. to 450° F. and thereafter introduced into a reaction vessel containing a suitable catalyst, such as bauxite. Space velocities employed with 2–4 mesh bauxite catalyst may range from about 1 to about 4 pound mols of gas per hour per cubic foot of catalyst. Under these conditions, the adiabatic outlet temperature ranges from about 525° F. to about 550° F. The hydrogen sulfide content of the feed may vary widely. However, it will seldom be over about 15 mol percent and generally will be no greater than 5 mol percent. Inerts and hydrocarbons usually make up approximately 80 to 90 mol percent of the feed. With feeds of this composition the concentration of oxygen needed in the feed to minimize catalyst deactivation is from about 0.5 to about 1 mol percent. This oxygen, which may be in the form of air, is added to the feed stream just ahead of the preheating step. Also, sulfur dioxide is supplied to the feed stream at the same stage of the process in an amount corresponding to a hydrogen sulfide-sulfur dioxide molar ratio of about 2 or about 2.5 to 1. The source of sulfur dioxide is not important. In most cases it will be more convenient merely to burn the product sulfur to supply the necessary amount of this reactant. Catalysts subjected to the above reaction conditions appear to be unaffected and there is no evidence of harmful deposition of carbonaceous material.

The process of my invention may be further illustrated by the following specific example:

*Example*

The effluent from a direct oxidation process after removal of most of the sulfur and after having oxygen (air) and sulfur dioxide added, has the following composition.

| Component: | Feed, mols |
|---|---|
| $H_2S$ | 4.71 |
| $N_2$ | 11.48 |

| Component: | Feed, mols |
|---|---|
| $N_2$ | 0.18 |
| A | 6.46 |
| $CO_2$ | 52.61 |
| $C_1$ | 10.28 |
| $C_2$ | 5.45 |
| $C_3$ | 0.33 |
| $iC_4$ | 1.11 |
| $nC_4$ | 0.32 |
| $C_{5'}s$ | 0.09 |
| $C_{6'}s$ | 0.03 |
| $C_{7'}s$ | 0.01 |
| $C_{8+'}s$ | 4.37 |
| $H_2O$ | 0.06 |
| COS | 0.34 |
| S as $S_1$ | 1.96 |
| $SO_2$ | 0.50 |
| $O_2$ | |

This feed is preheated to 425° F. and then introduced into a reactor containing 2–4 mesh bauxite catalyst under conditions such that the space velocity is 2 pound mols per hour per cubic foot of catalyst. The resulting reactor effluent has the following compositions:

| Component: | Effluent, mols |
|---|---|
| $H_2S$ | 0.55 |
| $N_2$ | 11.48 |
| A | 0.18 |
| $CO_2$ | 6.46 |
| $C_1$ | 52.61 |
| $C_2$ | 10.28 |
| $C_3$ | 5.45 |
| $iC_4$ | 0.33 |
| $nC_4$ | 1.11 |
| $C_{5'}s$ | 0.32 |
| $C_{6'}s$ | 0.09 |
| $C_{7'}s$ | 0.03 |
| $C_{8'}s$ | 0.01 |
| $H_2O$ | 6.85 |
| COS | 0.06 |
| S as $S_1$ | 6.18 |
| $SO_2$ | 0.28 |
| $O_2$ | 0.10 |

The above effluent, which is at a temperature of about 540° F., is then conducted to a condenser where it is cooled to about 300° F. to convert the free sulfur vapors to a liquid product which is withdrawn and stored.

Under the foregoing conditions, 82.4 percent of the hydrogen sulfide in the feed is converted to elemental sulfur—a very high yield—without deactivating the catalyst, which would have occurred if the oxygen had not been added.

From the above it will be seen that I have made an unobvious improvement in the method of recovering free sulfur from sour gas streams of the type contemplated herein. It is seen that the aforesaid means of securing this high sulfur recovery without harmful catalyst deactivation constitutes a very material advance in the economics of recovering sulfur from such streams.

The expression "heavy hydrocarbons," as used herein, is intended to cover $C_2$ to $C_{10}$ hydrocarbons present in the sour gas mixtures used in the process of my invention.

I claim:
1. In a process for the recovery of elemental sulfur from a gaseous mixture containing not more than about 10 mol percent hydrogen sulfide together with inerts and heavy hydrocarbons in a catalytic reaction zone, said heavy hydrocarbons tending to cause deactivation of the catalyst in said zone, the improvement which comprises adjusting the sulfur dioxide content of said mixture so that the hydrogen sulfide-sulfur dioxide ratio is from about 2 to about 2.5 to 1, adding to said mixture from about 0.5 to about 1 mol percent of oxygen, next preheating the resulting mixture to a temperature of from about 425° F. to about 450° F., thereafter contacting this hot gaseous mixture in a zone containing a catalyst for the reaction of hydrogen sulfide with sulfur dioxide to produce elemental sulfur at a temperature not in excess of 550° F., withdrawing from said zone the resulting product mixture and recovering sulfur therefrom.

2. The process of claim 1 in which the catalyst employed is bauxite.

3. The process of claim 1 in which the gaseous mixture employed is a natural gas containing heavy hydrocarbons.

4. In a process for the recovery of elemental sulfur from a gaseous mixture containing hydrogen sulfide, inerts, and heavy hydrocarbons, the improvement which comprises first subjecting the hydrogen sulfide in said mixture to direct oxidation in a zone by contacting a catalyst therein capable of promoting the reaction between hydrogen sulfide and oxygen to produce elemental sulfur, withdrawing the gaseous product mixture from said zone, thereafter removing elemental sulfur from said product mixture, adjusting the temperature of the resulting sulfur depleted mixture to a level of about 425° F. to about 450° F., adding sulfur dioxide to said sulfur depleted mixture in an amount such that the hydrogen sulfide-sulfur dioxide ratio therein is from about 2 to about 2.5 to 1, adding to said sulfur depleted mixture from about 0.5 to about 1 mol percent of oxygen, preheating the resulting mixture to a temperature of from about 425° F. to about 450° F., thereafter contacting this hot gaseous mixture in a zone with a catalyst for the reaction of hydrogen sulfide with sulfur dioxide to produce elemental sulfur at a temperature not in excess of about 550° F., withdrawing from said zone the resulting product mixture and recovering sulfur therefrom.

5. The process of claim 4 in which the direct oxidation step is carried out at a temperature not in excess of about 800° F.

6. The process of claim 5 in which the gaseous mixture employed is a natural gas containing heavy hydrocarbons and the catalyst is bauxite.

References Cited by the Examiner

UNITED STATES PATENTS 2,298,641  10/1942  Schulze et al. _____ 23—225
2,919,976   1/1960  Feagan _____ 23—225

OSCAR R. VERTIZ, *Primary Examiner.*

A. J. GREIF, *Assistant Examiner.*